US010210424B2

(12) United States Patent
Yu

(10) Patent No.: US 10,210,424 B2
(45) Date of Patent: Feb. 19, 2019

(54) METHOD AND SYSTEM FOR PREPROCESSING IMAGES

(71) Applicant: Alibaba Group Holding Limited, George Town (KY)

(72) Inventor: Kun Yu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 15/192,746

(22) Filed: Jun. 24, 2016

(65) Prior Publication Data
US 2017/0004378 A1    Jan. 5, 2017

(30) Foreign Application Priority Data

Jul. 2, 2015  (CN) .......................... 2015 1 0382366

(51) Int. Cl.
*G06K 9/00* (2006.01)
*G06K 9/46* (2006.01)
*G06K 9/62* (2006.01)

(52) U.S. Cl.
CPC ....... *G06K 9/4652* (2013.01); *G06K 9/00885* (2013.01); *G06K 9/4642* (2013.01); *G06K 9/6215* (2013.01)

(58) Field of Classification Search
CPC .............. G06K 9/4652; G06K 9/6215; G06K 9/00885; G06K 9/4642
USPC ....... 382/165, 162, 181, 219, 115, 154, 168, 382/195, 190, 199, 224; 1/1; 235/380; 340/5.83; 345/427; 358/448; 379/265.01; 704/239; 709/224
See application file for complete search history.

(56) References Cited

U.S. PATENT DOCUMENTS

| | | | | |
|---|---|---|---|---|
| 6,871,784 | B2 * | 3/2005 | Jayaratne | G06Q 20/341 235/380 |
| 6,944,318 | B1 * | 9/2005 | Takata | G06K 9/00617 235/380 |
| 7,444,022 | B2 | 10/2008 | Paschalakis | |
| 8,086,029 | B1 * | 12/2011 | Chien | H04N 1/6027 382/162 |
| 8,411,964 | B2 | 4/2013 | Choi | |
| 8,538,158 | B1 * | 9/2013 | Denise | H04M 19/04 379/265.01 |
| 8,570,403 | B2 * | 10/2013 | Lee | H04N 5/272 348/239 |
| 8,572,398 | B1 * | 10/2013 | Duncan | G06Q 20/40145 713/186 |
| 8,619,082 | B1 * | 12/2013 | Ciurea | H04N 13/0022 345/427 |
| 8,625,927 | B2 * | 1/2014 | Shechtman | G06K 9/6203 382/278 |
| 8,914,645 | B2 * | 12/2014 | Duncan | G06F 21/32 713/186 |
| 8,934,719 | B1 * | 1/2015 | Denise | H04M 19/04 382/190 |
| 9,177,225 | B1 * | 11/2015 | Cordova-Diba | G06T 5/00 |
| 9,384,382 | B1 * | 7/2016 | Denise | H04M 19/04 |
| 9,668,114 | B2 * | 5/2017 | Park | H04W 4/12 |

(Continued)

*Primary Examiner* — John B Strege
(74) *Attorney, Agent, or Firm* — Van Pelt, Yi & James LLP

(57) ABSTRACT

Preprocessing images is disclosed including determining a reference similarity of an image to be processed, and in the event that the reference similarity is less than or equal to a first preset threshold value, processing, based on a biometric color model, the image to determine a biometric color area of the image.

15 Claims, 13 Drawing Sheets

(56) References Cited

U.S. PATENT DOCUMENTS

| | | | |
|---|---|---|---|
| 9,747,496 B2* | 8/2017 | Suzuki | G06K 9/00362 |
| 2003/0002095 A1 | 1/2003 | Gruzdev | |
| 2006/0262363 A1 | 11/2006 | Henley | |
| 2012/0070036 A1 | 3/2012 | Lee | |
| 2012/0262473 A1* | 10/2012 | Kim | H04N 1/40006 |
| | | | 345/589 |
| 2013/0129209 A1 | 5/2013 | Reid | |
| 2015/0139536 A1 | 5/2015 | Jin | |
| 2015/0181112 A1 | 6/2015 | Oh | |
| 2015/0379369 A1* | 12/2015 | Liang | G06K 9/4652 |
| | | | 348/77 |

* cited by examiner

200

600

900

1200

METHOD AND SYSTEM FOR PREPROCESSING IMAGES

CROSS REFERENCE TO OTHER APPLICATIONS

This application claims priority to People's Republic of China Patent Application 201510382366.4 entitled AN IMAGE PREPROCESSING METHOD AND DEVICE filed Jul. 2, 2015 which is incorporated herein by reference for all purposes.

FIELD OF THE INVENTION

The present application relates to a method and system for preprocessing images.

BACKGROUND OF THE INVENTION

Image recognition refers to technology that uses computers to process, analyze and understand images, and recognize targets and objects in the images. During image recognition, people in images can be recognized.

In person recognition techniques, because skin color characteristics of people are distinct from colors of background objects, the person recognition techniques are typically performed based on the skin color characteristics of the people. To visually represent the skin color characteristics of the people, distribution patterns of the skin color characteristics within a defined color space are summarized in a skin color model. Skin color areas of an image can subsequently be determined based on the skin color model whereupon a person recognition technique is performed only on the skin color areas.

BRIEF DESCRIPTION OF THE DRAWINGS

Various embodiments of the invention are disclosed in the following detailed description and the accompanying drawings.

In order to describe the technical scheme of the embodiments of the present application or the prior art more clearly, below is a brief overview of the accompanying drawings used in the description of the embodiments of the present application or the prior art. Obviously, the drawings in the description below are only some of the embodiments of the present application. Without expending creative effort, persons with ordinary skill in the art can also arrive at other drawings based on these drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
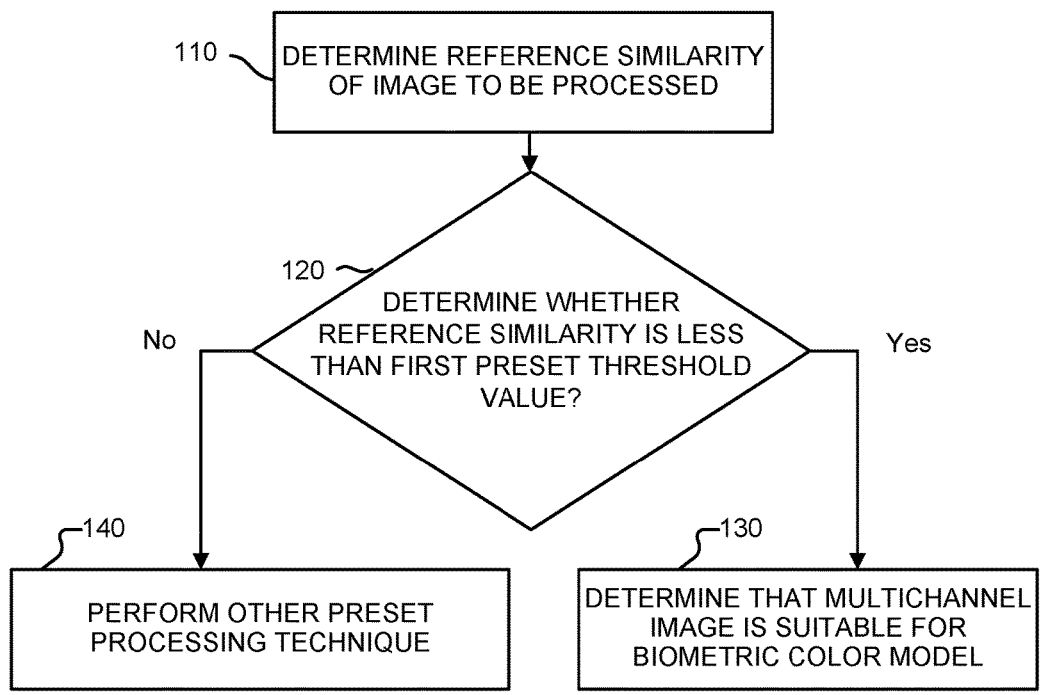
FIG. 1 is a flowchart of an embodiment of a process for preprocessing images.

FIG. 1 is a flowchart of an embodiment of a process for preprocessing images. In some embodiments, the process 100 is implemented by a server 1210 of FIG. 12.

Digital images are formed using pixels. The values used to represent the pixels are referred to as channels. For example, a color image in which pixels are represented as combinations of multiple primary colors is referred to as a multichannel image (e.g., an RGB image has a red channel, a green channel, and a blue channel.). A grayscale or monochrome image in which each pixel is represented as a single value is referred to as a single channel image.

In 110, the server determines a reference similarity of an image to be processed. In some embodiments, the image to be processed corresponds to a multichannel image, and the reference similarity is determined based on similarities of pairs of channels of the image to be processed. For example, for three channel RGB images, the R channel and the G channel form a pair.

Whether an image is a multichannel image or a single channel image can be determined by examining the format and/or values of the image. In the event that a color format of the image to be processed corresponds to a single-channel, this single-channel color format indicates that the image to be processed corresponds to a single-channel image, i.e., a grayscale image. In the event that the color format of the image to be processed corresponds to multi-channel, typically, this multichannel color format indicates that the image to be processed corresponds to a color image. As an example, in RGB color format multichannel images to be processed, R (red) represents red, G (green) represents green, and B (blue) represents blue. In the event that a numerical value of an R channel, a numerical value of a G channel, and a numerical value of a B channel are equal, the image to be processed, in terms of display effects, is a grayscale image. In the event that the numerical value of the R channel, the numerical value of the G channel, and the numerical value of the B channel are similar, the image to be processed, in terms of display effects, approximates a grayscale image. For example, an RGB formatted image can be represented as [r1,g1,b1, r2,g2,b2,r3,g3,b3 . . . ]. In this format, each r1, g1, b1, etc. can be represented as a value between 0-255. In the event that a multichannel image corresponds to a grayscale image or approximates a grayscale image, the image to be processed is not to be applied to the biometric color model or a skin color model.

As an example, some multichannel images (color images) that resemble grayscale images are unlikely to be suitable for processing using the biometric color model. Therefore, accurately identifying which color images of the multichannel images (color images) are suitable for the biometric color model (specifically, suitable for processing using the biometric color model) and avoiding the use of the biometric color model on pseudo-color images (color images that resemble grayscale images) that are unlikely to be suitable for the biometric color model is to be performed.

In another example, a determination, based on a reference similarity of the image to be processed, is made on whether an image is an approximate grayscale image. In some embodiments, the reference similarity expresses similarities between each channel of the image to be processed. For example, a higher reference similarity indicates that the various channels in an image to be processed are relatively similar, i.e., that the image to be processed relates to (that is, resembles or approximates) a grayscale image, and a lower reference similarity indicates that the various channels in the image to be processed are dissimilar, i.e., that the image to be processed relates to a color image.

Figure 2:
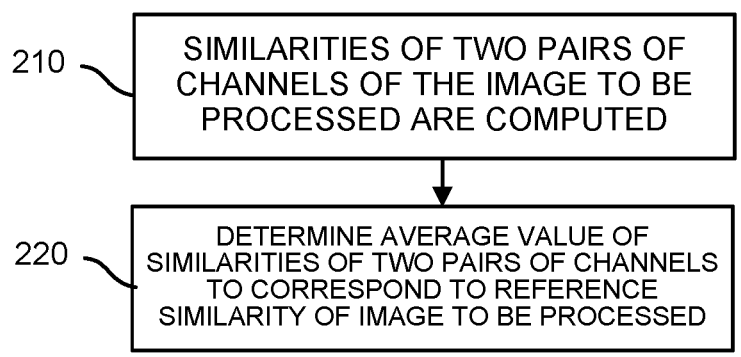
FIG. 2 is a flowchart of an embodiment of a process for determining a reference similarity.

FIG. 2 is a flowchart of an embodiment of a process for determining a reference similarity. In some embodiments, the process 200 is an implementation of operation 110 of FIG. 1 and comprises:

In 210, the similarities of two pairs of channels of the image to be processed are computed.

A reference similarity of the image to be processed can be viewed as a degree of similarity among all of the channels of the image to be processed. To compute the degree of similarity among all channels, the similarities between two pairs of channels of the image to be processed are first computed. Subsequently, the similarities between the two pairs of channels are merged to determine the degree of similarity among all channels.

In some embodiments, to compute the similarities between two pairs of channels, histograms of each of the two pairs of channels of the image to be processed are retrieved, distances between the histograms of the two pairs of channels are computed, and the computed distances relate to the similarities between the two pairs of channels.

As examples, a cosine distance between the histograms of the two pairs of channels is determined to correspond to the similarity of the two pairs of channels, a Manhattan distance between the histograms of the two pairs of channels is determined to correspond to the similarity of the two pairs of channels, or a chi-square distance between the two pairs of channels can be determined to correspond to the similarity of the two pairs of channels. Computing a cosine distance, a Manhattan distance, or a chi-square distance is understood to those skilled in the art and will not be further discussed for conciseness. Other known methods can be used to compute the distance between the histograms of the two pairs of channels, and will not be further discussed for conciseness.

Based on the computed distances, the greater the distances are between the histograms of the two pairs of channels, the smaller the similarity between the two pairs of channels, and the smaller the distances are between the histograms of the two pairs of channels, the greater the similarity between the two pairs of channels.

Using an example of an RGB format image to be processed, a histogram of the R channel, a histogram of the G channel, and a histogram of the B channel are extracted. For example, the histogram describes the number of pixels that corresponds to grayscale (or frequency of appearance of grayscale pixels): the abscissa corresponds to the gray level, and the ordinate relates to the number (frequency) of the grayscale pixels appearing in the image. A distance between the histogram of the R channel and the histogram of the G channel, a distance between the histogram of the G channel and the histogram of the B channel, and a distance between the histogram of the R channel and the histogram of the B channel are computed to obtain three similarities of the two pairs of channels of the three channels (the R channel, the G channel, and the B channel).

In 220, the server determines an average value of the similarities of the two pairs of channels to correspond to a reference similarity of the image to be processed.

In some embodiments, after multiple similarities between the two pairs of channels of multiple channels are obtained in operation 210, the multiple similarities are sorted or ranked. In some embodiments, the greater the similarity of the two pairs of channels is, the greater the likelihood that numerical values of the two pairs of channels are to be equal. In other words, the more the image to be processed resembles a grayscale image, the smaller the similarity is. In another example, the more the numerical values of the two pairs of channels are likely to be unequal, the more the image to be processed resembles a color image.

In some embodiments, to comprehensively consider sizes of multiple similarities, the average value of the similarities of multiple two pairs of channels is determined to be the reference similarity of the image to be processed. A determination, based on the reference similarity, can be made as to whether the image to be processed is suitable for the biometric color model.

After the multiple similarities of the two pairs of channels are determined, other methods can also be used to determine the reference similarity. For example, the greatest value among the multiple similarities corresponds to the reference similarity of the image to be processed. In another example, the smallest value among the multiple similarities corresponds to the reference similarity of the image to be processed, etc.

The greatest value among the multiple similarities relates to the similarity of the two most similar channels in the image. In the event that the image to be processed is a grayscale image, the similarity of the two most similar channels in the image would be the greatest (e.g., the R and G channels are identical). If the greatest similarity is used as the reference similarity, and the image to be processed is determined to be suitable for the biometric color model, then the image to be processed is to be suitable for the biometric color model. On the other hand, if the greatest similarity is used as the reference similarity and the image to be processed is determined to be unsuitable for processing based on the biometric color model, it cannot be concluded that the image to be processed is unsuitable for processing using the biometric color model.

The smallest value among the similarities relates to the similarity of the two channels having the least similarity, i.e., the similarity that best indicates that the image to be processed is a color image. In the event that the smallest similarity is used as the reference similarity, and the image to be processed is still determined to be unsuitable for the biometric color model, then the image to be processed is unsuitable for the biometric color model. On the other hand, if the smallest similarity is used as the reference similarity and the image to be processed is determined to be suitable for the biometric color model, it cannot be concluded that the image to be processed is suitable for processing using the biometric color model.

The value of reference similarity obtained can vary based on the technique used to determine the reference similarity. Therefore, using different techniques for determining the reference similarity can result in changes in the results obtained regarding suitability for the biometric color model. Thus, in some embodiments, the technique used to compute the reference similarity is to be decided based on the actual situation.

Using an RGB format example, after the three similarities between the two pairs of channels for the three channels (the R channel, the G channel, and the B channel) are obtained, the average value, the greatest value, or the smallest value of the three similarities between the two pairs of channels for the three channels (the R channel, the G channel, and the B channel) is to be the reference similarity of the image to be processed.

Referring back to FIG. 1, in 120, the server determines whether the reference similarity is less than a first preset threshold value. In the event that the reference similarity is less than a first preset threshold value, control passes to 130; otherwise, control passes to 140.

Figure 3:
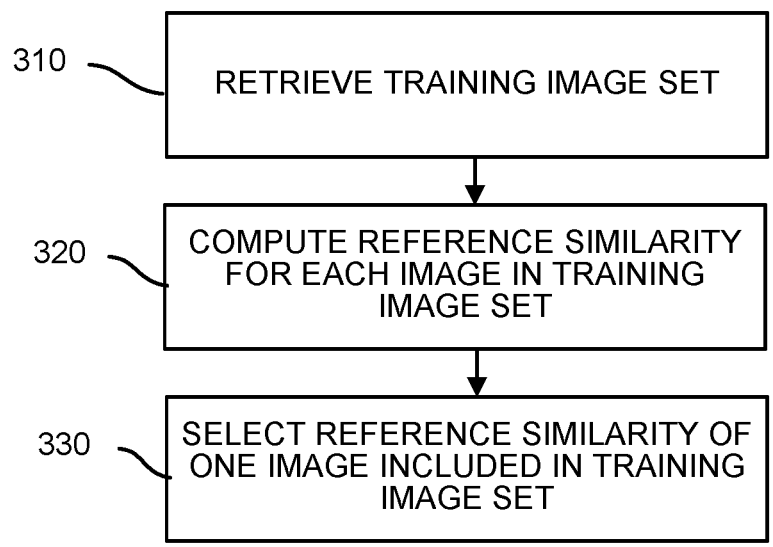
FIG. 3 is a flowchart of an embodiment of a process for determining a first threshold value.

FIG. 3 is a flowchart of an embodiment of a process for determining a first threshold value. In some embodiments, the process 300 is implemented by a server 1210 of FIG. 12 and comprises:

In 310, the server retrieves a training image set. In some embodiments, the training image set includes at least one image that is suitable for a biometric color model and at least one image that is unsuitable for processing using the biometric color model.

First, an image set including multiple images is retrieved. In some embodiments, the image set includes images suitable for the biometric color model and images unsuitable for the biometric color model. Then, through experimentation or manually, a determination is made as to whether each image is suitable for the biometric color model, and a label indicating whether the image is suitable or unsuitable is added to each image, and the labeled image set is used as the training image set.

As an example, a training image set includes 9 images where 5 images are suitable for the biometric color model, and are represented or labeled using A1, A2, A3, A4, and A5, and the remaining 4 images that are unsuitable for the biometric color are represented or labeled using B1, B2, B3, and B4. Other types of labels such as 1 indicating an image is a suitable image and 0 indicating an image is an unsuitable image can be used.

In 320, the server computes a reference similarity for each image in the training image set.

Figure 4:
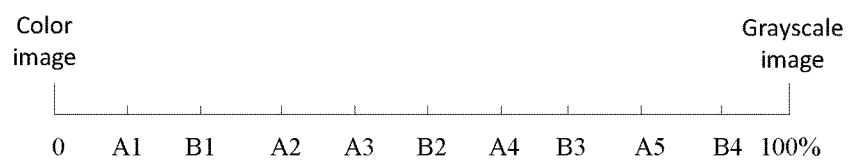
FIG. 4 is a schematic diagram of an example of a distribution of multiple reference similarities.

In some embodiments, the reference similarity is computed as described in operation 110 of FIG. 1 to obtain an image set including reference similarities and labels. FIG. 4 is a schematic diagram of an example of a distribution of multiple reference similarities corresponding to different images. As shown in FIG. 4, a smaller reference similarity indicates that an image is suitable for the biometric color model; a greater reference similarity indicates that the image is unsuitable for the biometric color model; and a reference similarity in the middle area indicates that some images are suitable for the biometric color model and some images are unsuitable for the biometric color model.

Referring back to FIG. 3, in 330, the server, based on a false acceptance rate set in advance, selects a reference similarity of one image included in the training image set and determines the selected reference similarity to be a first preset threshold value.

In some embodiments, a false acceptance rate corresponds to a probability of erroneously determining an image that is unsuitable for processing using the biometric color model to be suitable for processing using the biometric color model. The false acceptance rate relates to a number of images whose reference similarities are less than the first preset threshold value and unsuitable for biometric color model divided by a total number of images unsuitable for the biometric color model. In some embodiments, the acceptable false acceptance rate can be set in advance. During training of the image set, an image's reference similarity can be set as a first threshold, such that the ratio of the number of images whose reference similarities are less than the first threshold and are unsuitable for the biometric color model and all images unsuitable for biometric color model does not exceed the preset false acceptance rate, such that a ratio of the number of images unsuitable for the biometric color model among the images whose reference similarities are lower than the first preset threshold value to the total number of all images that are not suitable for biometric color model is not greater than the set false acceptance rate.

For example, assume that the false acceptance rate set in advance is 25%. Referring to FIG. 4, assume that B2 is selected as the first preset threshold value, then four images having similarities lower than the first preset threshold value can be obtained (A1, B1, A2, and A3). Of the four images, one image (B1) is deemed to be unsuitable for the biometric color model. Because images unsuitable for the biometric color model are B1, B2, B3, and B4, the total number of images unsuitable for the biometric color model is four. Thus the false acceptance rate corresponds to ¼*100%=25%, and the preset false acceptance rate is satisfied. Whether an image is suitable for biometric color model is known, pre-specified. Suitability does not have anything to do with the computation techniques. Thus, the reference similarity corresponding to B2 can be used as the first preset threshold value. In some embodiments, using a reference similarity lower than that of B2 as the first preset threshold value is also possible, for example, A1, B1, A2, or A3 can be selected as the first preset threshold value.

Of course, other techniques can also be used to determine the first preset threshold value. For example, the first preset threshold value can be determined based on historical experience, or the first preset threshold value can be determined using other processing techniques. Descriptions of the other processing techniques are not to be discussed here for conciseness.

Through the above operations, a determination, based on the first preset threshold value, can be made as to whether the image to be processed is suitable for the biometric color model. In the event that the reference similarity of the image to be processed is less than the first preset threshold value, this situation indicates that the image to be processed is suitable for the biometric color model; and in the event that the reference similarity of the image to be processed is greater than the first preset threshold value, this situation indicates that the image to be processed may be unsuitable for the biometric color model.

Referring back to FIG. 1, in 130, in the event that the reference similarity is less than the first preset threshold value, the server determines that the multichannel image is suitable for the biometric color model. People's biometric color or skin color has good stability, and different from the color of the background object. For example, experiments show the skin tone of people having different skin colors is relatively consistent, and the main differences lie in the gray level. The main characteristics of a person's face color are described by the biometric color model. The biometric color model is a mathematical model describing the distribution of people's biometric colors in a certain color space. Basically, the biometric color model is a statistically determined distribution of various biometric colors in a particular color space. In this color space, a biometric color can be expressed as a combination of a series of parameters.

In the event that the reference similarity of the image to be processed is less than the first preset threshold value, this situation indicates that the image to be processed resembles a color image. Therefore, the image to be processed is determined to be suitable for the biometric color model. Thereafter, the preprocessing of the image to be processed and the obtaining of the biometric color areas are performed based on the biometric color model. Subsequently, person recognition processing can be performed with respect to the obtained biometric color areas, to determine characters.

In 140, the server performs another preset processing technique.

In the event that the reference similarity of the image to be processed is not less than the first preset threshold value, this situation indicates that the image to be processed does not relate to a color image. At this time, the image to be processed can be determined to be unsuitable for the biometric color model directly, and a person recognition processing technique can be performed directly on the image to be processed.

Because the image to be processed cannot be determined to be suitable for the biometric color model in operation 140, in the event that the biometric color model is used erroneously on the image to be processed, using the biometric color model on the image to be processed could lead to obtaining inaccurate biometric color areas and could then result in inaccurate results when a person recognition processing technique is performed on the biometric color areas. Therefore, at this time, the biometric color model preprocessing process can be omitted to increase the accuracy of person recognition. In another example, the first preset threshold value can be revised, and a determination of the image to be processed can be performed again to determine whether the image to be processed is suitable for the biometric color model. Without the biometric color model, facial recognition requires examining all the regions in the entire picture to determine whether something is a face. With the biometric color model, facial recognition is to determine whether regions having biometric color are faces, and other regions are ruled out. Since the amount of biometric-colored regions tends to be small, the processing time for facial recognition is reduced.

In some embodiments, the reference similarity of the image to be processed is computed. In some embodiments, the greater the reference similarity, the more the image to be processed resembles a grayscale image, and the lower the reference similarity, the more the image to be processed resembles a color image. Therefore, a first preset threshold value is set to indicate that an image is a color image. In the event that the reference similarity of the image to be processed is less than the first preset threshold value, this situation indicates that the image is a color image, and the image to be processed is then determined to be suitable for the biometric color model. The biometric color model can then be used on images suitable for the biometric color model to obtain accurate biometric color areas.

Figure 5:
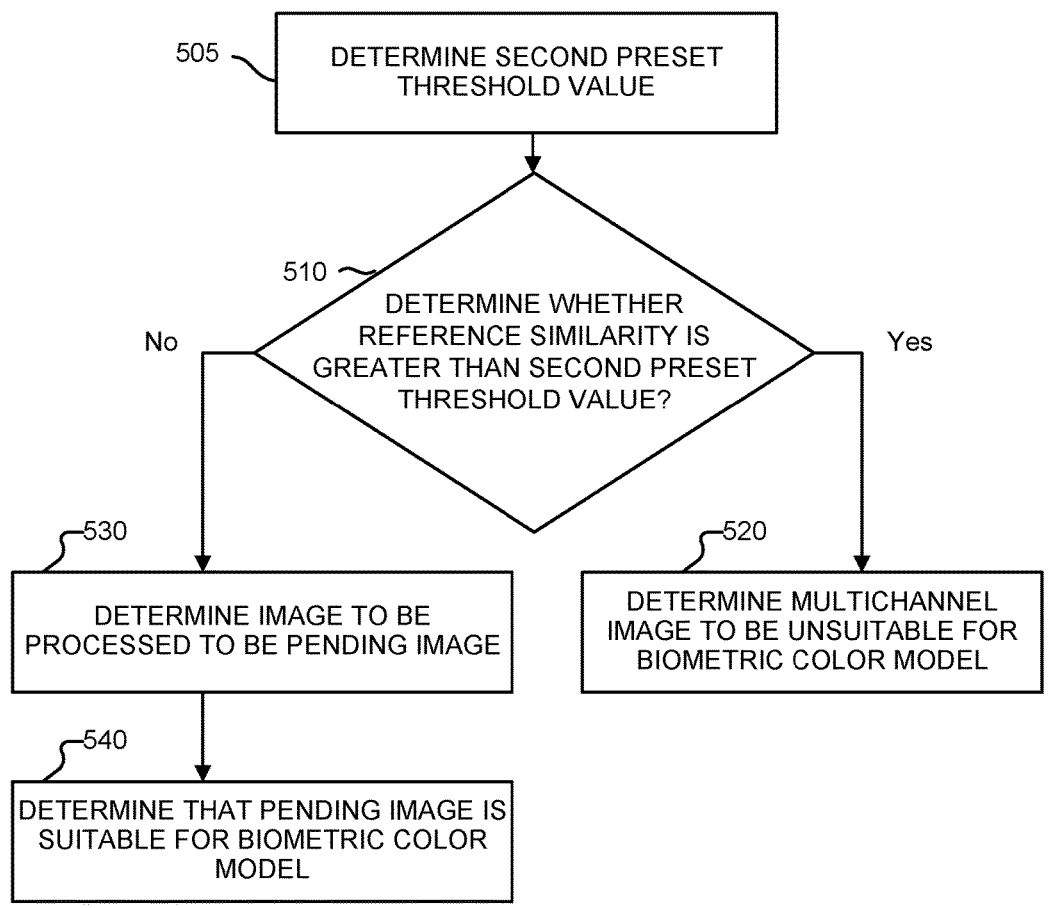
FIG. 5 is a flowchart of another embodiment of a process for preprocessing images.

Below is an overview of another technique of performing other preset processing processes on the image to be processed:

In operation 140 of FIG. 1, in the event that the image to be processed is not less than the first preset threshold value, at least two possible situations exist for the image to be processed: in one possible situation, the image to be processed is unsuitable for the biometric color model, and in another possible situation, the image to be processed is in a fuzzy zone, i.e., whether the image to be processed is suitable for the biometric color model cannot be clearly determined. Therefore, after the reference similarity of the image to be processed is determined to be not less than the first preset threshold value in FIG. 1, the process can continue to determine whether the image to be processed is suitable for the biometric color model. FIG. 5 is a flowchart of another embodiment of a process for preprocessing images. In some embodiments, the process 500 is an implementation of operation 140 of FIG. 1 and comprises:

In 505, the server determines a second preset threshold value.

Figure 6:
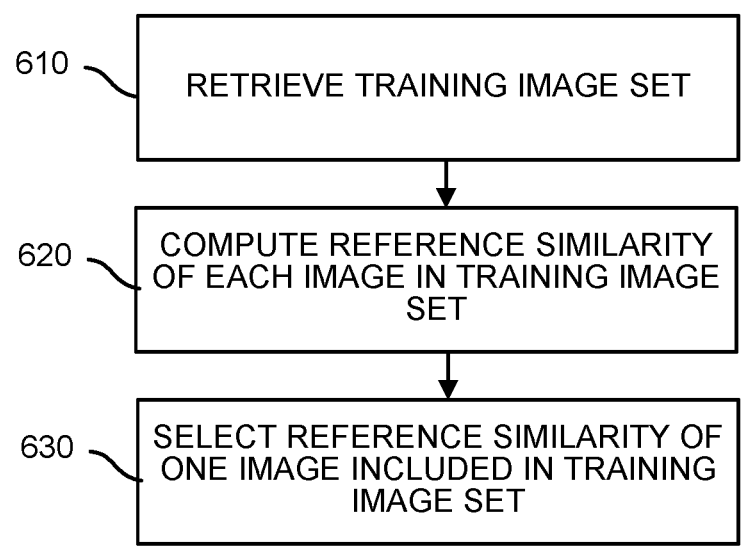
FIG. 6 is a flowchart of an embodiment of a process for determining a second preset threshold value.

In some embodiments, the second preset threshold value is determined based on a technique similar to the technique for determining the first preset threshold value. FIG. 6 is a flowchart of an embodiment of a process for determining a second preset threshold value. In some embodiments, the process 600 is an implementation of operation 505 of FIG. 5 and comprises:

In 610, the server retrieves a training image set. In some embodiments, the training image set includes at least one image that is suitable for the biometric color model and at least one image that is unsuitable for the biometric color model.

In 620, the server computes a reference similarity of each image in the training image set.

In some embodiments, operations 610 and 620 correspond with operations 310 and 320 of FIG. 3, and will not be further discussed for conciseness.

In 630, based on a false rejection rate set in advance, the server selects the reference similarity of one image included in the training image set, and determines the reference similarity to be the second preset threshold value.

In some embodiments, the false rejection rate corresponds to a probability of erroneously determining an image that is suitable for the biometric color model as unsuitable for the biometric color model. False rejection rate corresponds to a number of images whose reference similarities are greater than the second threshold and are suitable for biometric color model divided by a total number of images suitable for the biometric color model. In some embodiments, an acceptable false rejection rate is set in advance, and then the reference similarity of one image included in the training image set is selected and the reference similarity is determined to be the second preset threshold value, to ensure a ratio of a number of images suitable for the biometric color model among the images greater than the second preset threshold value to a total number of images suitable for biometric color model is not greater than the set false rejection rate.

For example, the false rejection rate is set in advance at 20%. Referring again to FIG. 4, assuming that A4 is selected as the second preset threshold value, then the similarities of three images (A5, B3, and B4) greater than the second preset threshold value are obtained. Of the four images, one image (A5) is deemed to be suitable for the biometric color model, and a total of five images (A1, A2, A3, A4, and A5) are deemed to be suitable for the biometric color model, thus the false rejection rate is ⅕*100%=20%, and the preset false rejection rate is satisfied. Therefore, the reference similarity corresponding to A4 can be used as the second preset threshold value. In another example, a reference similarity greater than A4 can be used as the second preset threshold value, for example, A5, B3, or B4, in which cases the false rejection rates would be 0.

Other techniques can be used to determine the first or second preset threshold value. For example, the second preset threshold value can be determined based on historical experience, or other techniques can be used to determine the second preset threshold value. The other techniques are not to be further described for conciseness.

The first and second threshold values are selected using the same technique. If you switch to a different metric, then both the first and second threshold values are to change. For example, under a particular similarity value, the similarity range is between 0-1. One threshold value takes the portion with the greatest similarity, the other threshold value takes the portion with the smallest similarity.

Through the operations above, a determination, based on the second preset threshold value, can be made whether the image to be processed is suitable for the biometric color model.

Referring back to FIG. 5, in 510, the server determines whether a reference similarity is greater than the second preset threshold value. In the event that the reference similarity is greater than the second preset threshold value, then control passes to 520. In the event that the reference similarity is not greater than the second preset threshold value, control passes to 530.

In 520, in the event that the reference similarity is greater than the second preset threshold value, the server determines the multichannel image to be unsuitable for the biometric color model. In some embodiments, the second preset threshold value is greater than the first preset threshold value.

In the event that the reference similarity of the image to be processed is greater than the second preset threshold value, this situation indicates that the image to be processed relates to a grayscale image, and indicates that the image to be processed is unsuitable for the biometric color model.

In 530, in the event that the reference similarity is not less than the first preset threshold value and is not greater than the second preset threshold value, the server determines the image to be processed to be a pending image.

In the event that the reference similarity of the image to be processed is not less than the first preset threshold value and not greater than the second preset threshold value, this situation indicates that the image to be processed is in a fuzzy zone, i.e., whether the image to be processed is suitable for the biometric color model cannot be clearly determined using the reference similarity of the image to be processed, and therefore the image to be processed is determined to be a pending image.

In 540, the server determines, based on a preset processing technique, that the pending image is suitable for the biometric color model.

Based on process 100 of FIG. 1, an image to be processed can be clearly determined to be an image that is suitable for the biometric color model, and based on process 500 of FIG. 5, a pending image can be clearly determined to be an image that is unsuitable for the biometric color model. In the event that a determination cannot be made as to whether an image to be processed is suitable for the biometric color model based on processes 100 and 500 of FIGS. 1 and 5, a preset processing technique can be utilized to perform another round of processing of the image to be processed to determine whether the image to be processed is suitable for the biometric color model.

In some embodiments, the reference similarity of the image to be processed is computed. The higher the reference similarity is, the more the image to be processed resembles a grayscale image, and the lower the reference similarity is, the more the image to be processed resembles a color image. Therefore, the second preset threshold value is set to indicate that the image is a grayscale image. In the event that the reference similarity of the image to be processed is greater than the second preset threshold value, this situation indicates that the image is a grayscale image, and the image to be processed is therefore determined to be unsuitable for the biometric color model.

Figure 7:
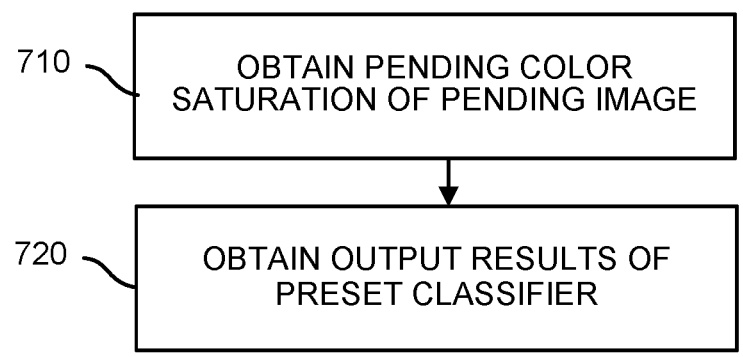
FIG. 7 is a flowchart of another embodiment of a process for preprocessing images.

FIG. 7 is a flowchart of another embodiment of a process for preprocessing images. In some embodiments, the process 700 is an implementation of operation 540 of FIG. 5 and comprises:

In 710, the server obtains a pending color saturation of a pending image.

Color saturation relates to a purity of color. The higher the purity of the color, the brighter the image appears on the display, and the lower the purity of the color, the darker the image appears on the display. The brighter an image is in terms of the display effects, the more the image resembles a color image, and the darker an image is in terms of the display effects, the more the image resembles a grayscale image.

Therefore, the color saturation of the pending image can be extracted, and the color saturation can be used to further determine whether the pending image is suitable for the biometric color model.

Using an example of a pending image that is an RGB format image, the retrieving of the pending color saturation of the pending image includes converting the RGB format image into an HIS format image. In some embodiments, H represents hue, I represents lightness model, and S represents saturation. Therefore, after converting the image into the HIS format image, a histogram of the S channel can be extracted directly to serve as the pending color saturation of the pending image.

Computing the color saturation of the pending image can be performed on other color formats. For example, a technique for converting the pending image to an RGB format, an LAB format, or an XYZ format, and then computing color saturations in each of the various color formats to obtain the color saturation of the pending image can be used. Other techniques can be used to compute the color saturation. The other techniques will not be further described for conciseness.

In 720, the server obtains an output result of a preset classifier by entering the pending color saturation into a preset classifier. In some embodiments, the classifier is established in advance, the input parameter is color saturation, and the output result corresponds to a model indicating whether the image is suitable for the biometric color model.

In some embodiments, the preset classifier is obtained in advance based on the training image set retrieved in operation 310 of FIG. 3 after training, and the technique for constructing the classifier can utilize algorithms such as decision trees, association rules, Bayesian probability, neural networks, rule learning, k-nearest neighbors algorithm, genetic algorithms, etc. to train the data set, and thereby construct the classifier. The training technique can be used to determine a computational formula and a threshold value. Machine learning algorithms have optimization objectives. Each category's loss function is different. In general, learning is about getting to the smallest loss function based on the characteristics and the corresponding labels. A classifier can to classify the samples (e.g., giving the samples labels), or output a distance, probability, etc. based on this group of parameters. The computational formula can be used to perform computations on the color saturation and obtain a computation result. The threshold value can be used to determine whether the computation result is an image suitable for the biometric color model.

In some embodiments, the pending color saturation of the pending image can be entered into the preset classifier, and the preset classifier performs computations on the pending color saturation using a computational formula to obtain a pending computation result. The pending computation result is compared against the threshold value. In the event that the computation result is greater than or equal to the threshold value, the pending image is determined to be suitable for the biometric color model, and in the event that the computation result is less than the threshold value, the pending image is determined to be unsuitable for the biometric color model.

The preset classifier process 700 is utilized to further determine whether the pending image is suitable for the biometric color model, and thereby determine whether a pending image in a fuzzy zone is suitable for the biometric color model.

The images in embodiments in FIGS. 1-7 can all be RGB color format images. Because the RGB format is a standard color format for images, processing images based on the RGB color format can facilitate preprocessing images and can make the results obtained more accurate.

Figure 8:
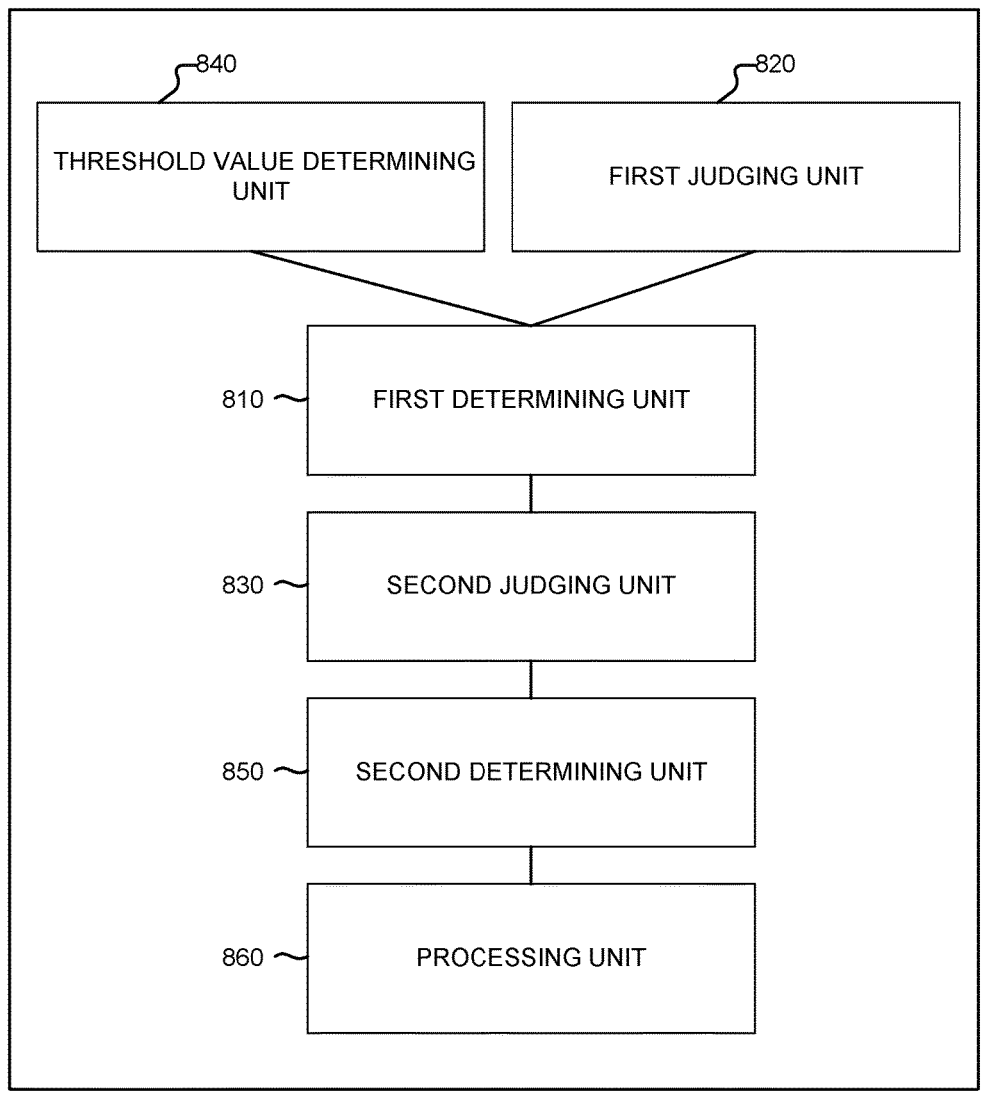
FIG. 8 is a structural schematic diagram of an embodiment of a device for preprocessing images.

FIG. 8 is a structural schematic diagram of an embodiment of a device for preprocessing images. In some embodiments, the device 800 is configured to implement process 100 of FIG. 1 and comprises: a first determining unit 810, a first judging unit 820, a second judging unit 830, a threshold value determining unit 840, a second determining unit 850, and a processing unit 860.

In some embodiments, the first determining unit 810 is configured to determine a reference similarity of an image to be processed. In some embodiments, the image to be processed is a multichannel image, and the reference similarity is determined based on similarities of two pairs of channels of the image to be processed.

In some embodiments, the first judging unit 820 is configured to, in the event that the reference similarity is less than a first preset threshold value, determine whether a multichannel image is suitable for a biometric color model.

In some embodiments, the second judging unit 830 is configured to, in the event that the reference similarity is greater than a second preset threshold value, determine whether the multichannel image is unsuitable for the biometric color model. In some embodiments, the second preset threshold value is greater than the first preset threshold value.

In some embodiments, the threshold value determining unit 840 is configured to determine the first preset threshold value and the second preset threshold value.

In some embodiments, the second determining unit 850 is configured to, in the event that the reference similarity is not less than the first preset threshold value and is not greater than the second preset threshold value, determine whether the image to be processed is a pending image.

In some embodiments, the processing unit 860 is configured to determine whether the pending image is suitable for the biometric color model based on a preset processing technique.

Figure 9:
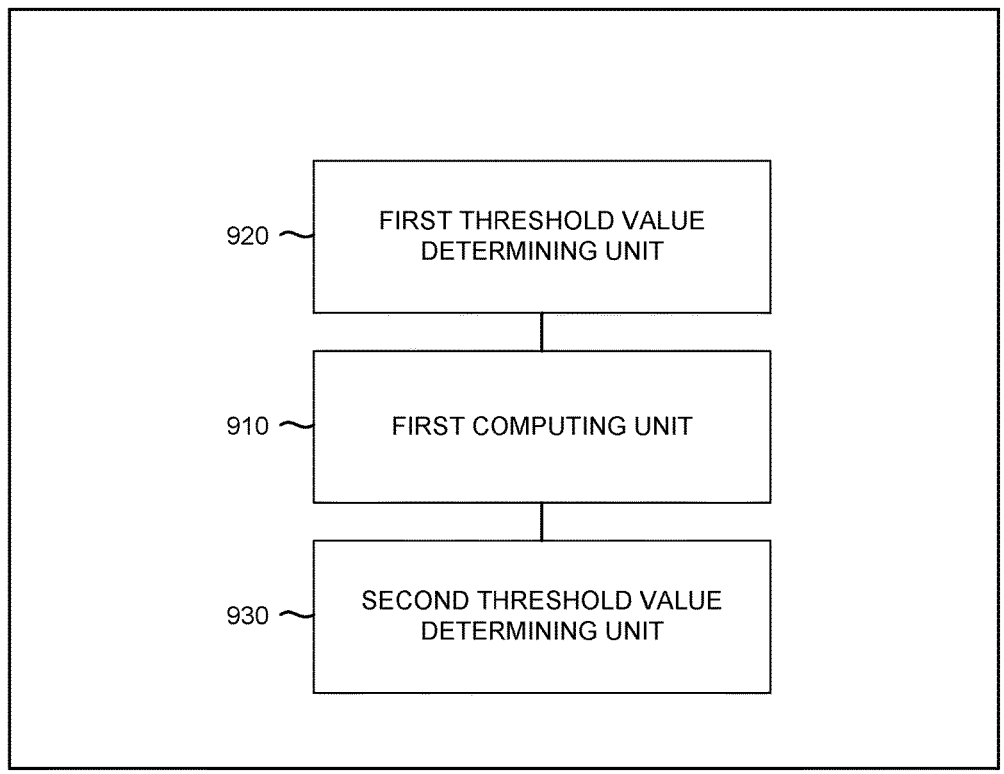
FIG. 9 is a structural schematic diagram of an embodiment of a threshold value determining unit.

FIG. 9 is a structural schematic diagram of an embodiment of a threshold value determining unit. In some embodiments, the threshold value determining unit 900 is an implementation of the threshold value determining unit 840 of FIG. 8 and comprises: a first computing unit 910, a first threshold value determining unit 920, and a second threshold value determining unit 930.

In some embodiments, the first computing unit 910 is configured to compute a reference similarity of each image contained in a training image set. In some embodiments, the training image set includes at least one image that is suitable for the biometric color model and at least one image that is unsuitable for the biometric color model.

In some embodiments, the first threshold value determining unit 920 is configured to select a reference similarity of an image included in the training image set based on a false acceptance rate set in advance, and determine the reference similarity to be the first preset threshold value.

In some embodiments, the second threshold value determining unit 930 is configured to select a reference similarity of an image included in the training image set based on a false rejection rate set in advance, and determine the reference similarity to be the second preset threshold value.

Figure 10:
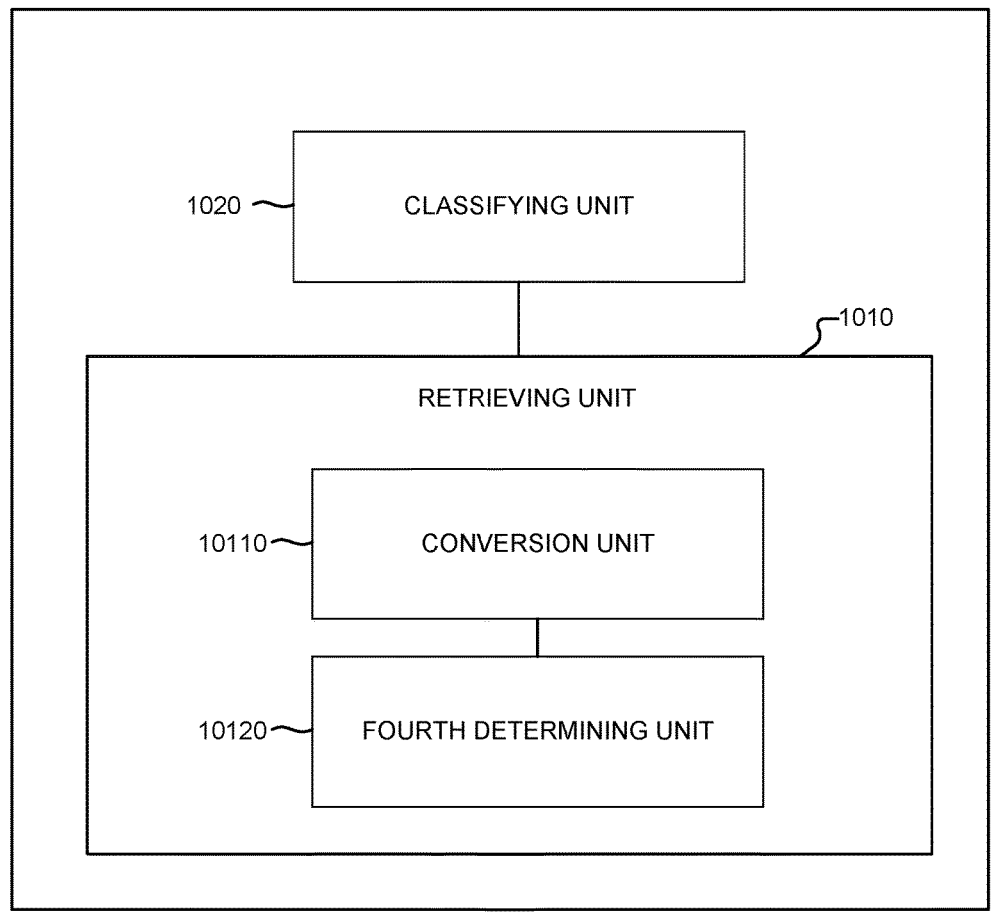
FIG. 10 is a structural schematic diagram of an embodiment of a processing unit.

FIG. 10 is a structural schematic diagram of an embodiment of a processing unit. In some embodiments, the processing unit 1000 is an implementation of the processing unit 860 of FIG. 8 and comprises: a retrieving unit 1010 and a classifying unit 1020.

In some embodiments, the retrieving unit 1010 is configured to retrieve a pending color saturation of a pending image.

In some embodiments, the classifying unit 1020 is configured to input the pending color saturation into a preset classifier to obtain an output result of the preset classifier. In some embodiments, the preset classifier is established in advance, an input parameter is color saturation, and the output result is a model representing whether the image is suitable for the biometric color model.

In some embodiments, the retrieving unit 1010 further comprises: a conversion unit 10110 and a fourth determining unit 10120.

In some embodiments, the conversion unit 10110 is configured to convert an image format of the pending image into an HIS format.

In some embodiments, the fourth determining unit 10120 is configured to determine a histogram of an S channel of the pending image to be the color saturation of the pending image.

Figure 11:
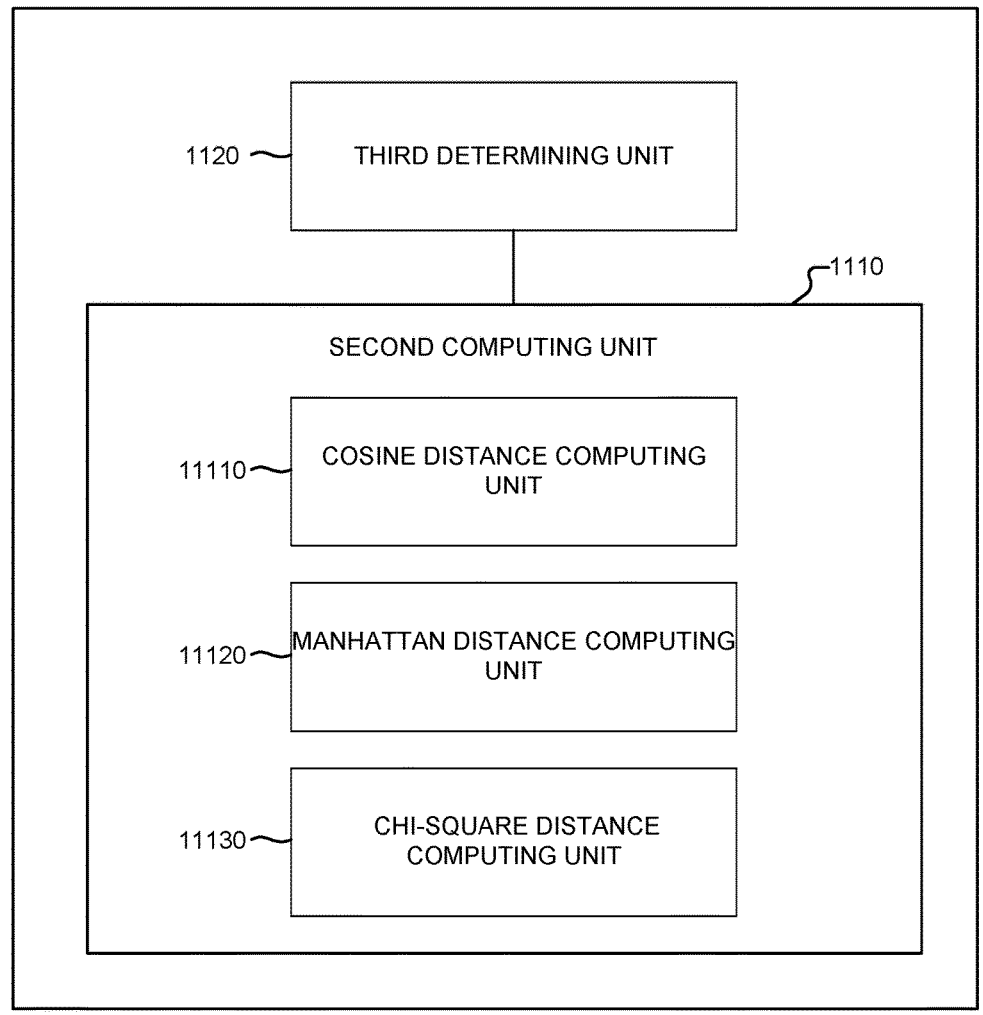
FIG. 11 is a structural schematic diagram of an embodiment of a first determining unit.

FIG. 11 is a structural schematic diagram of an embodiment of a first determining unit. In some embodiments, the first determining unit 1100 is an implementation of the first determining unit 810 of FIG. 8 and comprises: a second computing unit 1110 and a third determining unit 1120.

In some embodiments, the second computing unit 1110 is configured to compute similarities of two pairs of channels of the image to be processed.

In some embodiments, the third determining unit 1120 is configured to determine a greatest value or an average value of the similarities of the two pairs of channels to be the reference similarity of the image to be processed.

In some embodiments, the second computing unit 1110 includes one of a cosine distance computing unit 11110, a Manhattan distance computing unit 11120, or a chi-square distance computing unit 11130.

In some embodiments, the cosine distance computing unit 11110 is configured to determine cosine distances between histograms of two pairs of channels to be similarities of the two pairs of channels.

In some embodiments, the Manhattan distance computing unit 11120 is configured to determine Manhattan distances between histograms of two pairs of channels to be similarities of the two pairs of channels.

In some embodiments, the chi-square distance computing unit 11130 is configured to determine chi-square distances between histograms of two pairs of channels to be similarities of the two pairs of channels.

In the device shown in FIGS. 8-11, the image to be processed is an RGB color format image.

In some embodiments, the reference similarity of the image to be processed is computed. The higher the reference similarity is, the more the image to be processed resembles a grayscale image, and the lower the reference similarity is, the more the image to be processed resembles a color image. Therefore, a first preset threshold value is set to indicate that an image is a color image. In the event that the reference similarity of the image to be processed is less than the first preset threshold value, this situation indicates that the image is a color image, and the image to be processed is therefore determined to be suitable for the biometric color model. Subsequently, using the biometric color model on images, to obtain accurate biometric color areas, a determination is possible to be made whether the images are suitable for the biometric color model.

Additionally, determining images that are clearly unsuitable for the biometric color model, and subsequently performing another determination with respect to images that fall into a fuzzy zone between those suitable for the biometric color model and those unsuitable for the biometric color model, allows determining with the greatest accuracy possible whether each image to be processed is suitable for the biometric color model.

The units described above can be implemented as software components executing on one or more general purpose processors, as hardware such as programmable logic devices and/or Application Specific Integrated Circuits designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple subunits.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 12:
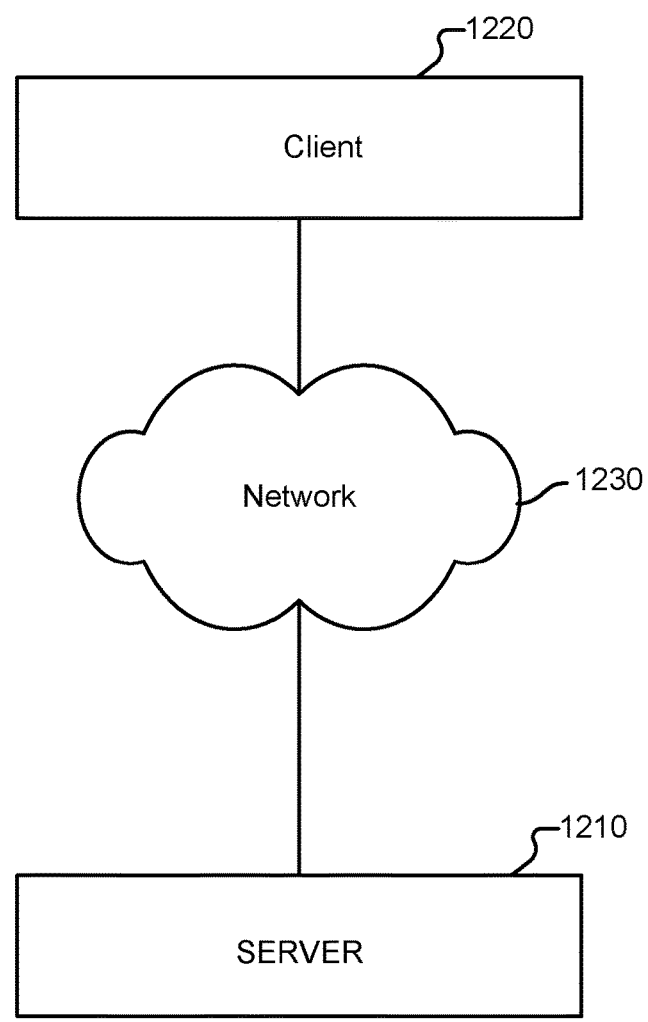
FIG. 12 is a diagram of an embodiment of a system for preprocessing images.

FIG. 12 is a diagram of an embodiment of a system for preprocessing images. In some embodiments, the system 1200 includes a client 1220 connected to a server 1210 via a network 1230.

In some embodiments, the server 1210 receives an image to be processed from the client 1220, determines a reference similarity of the image to be processed, and in the event that the reference similarity is less than a first preset threshold value, determines the image to be processed to be suitable for a biometric color model.

Figure 13:
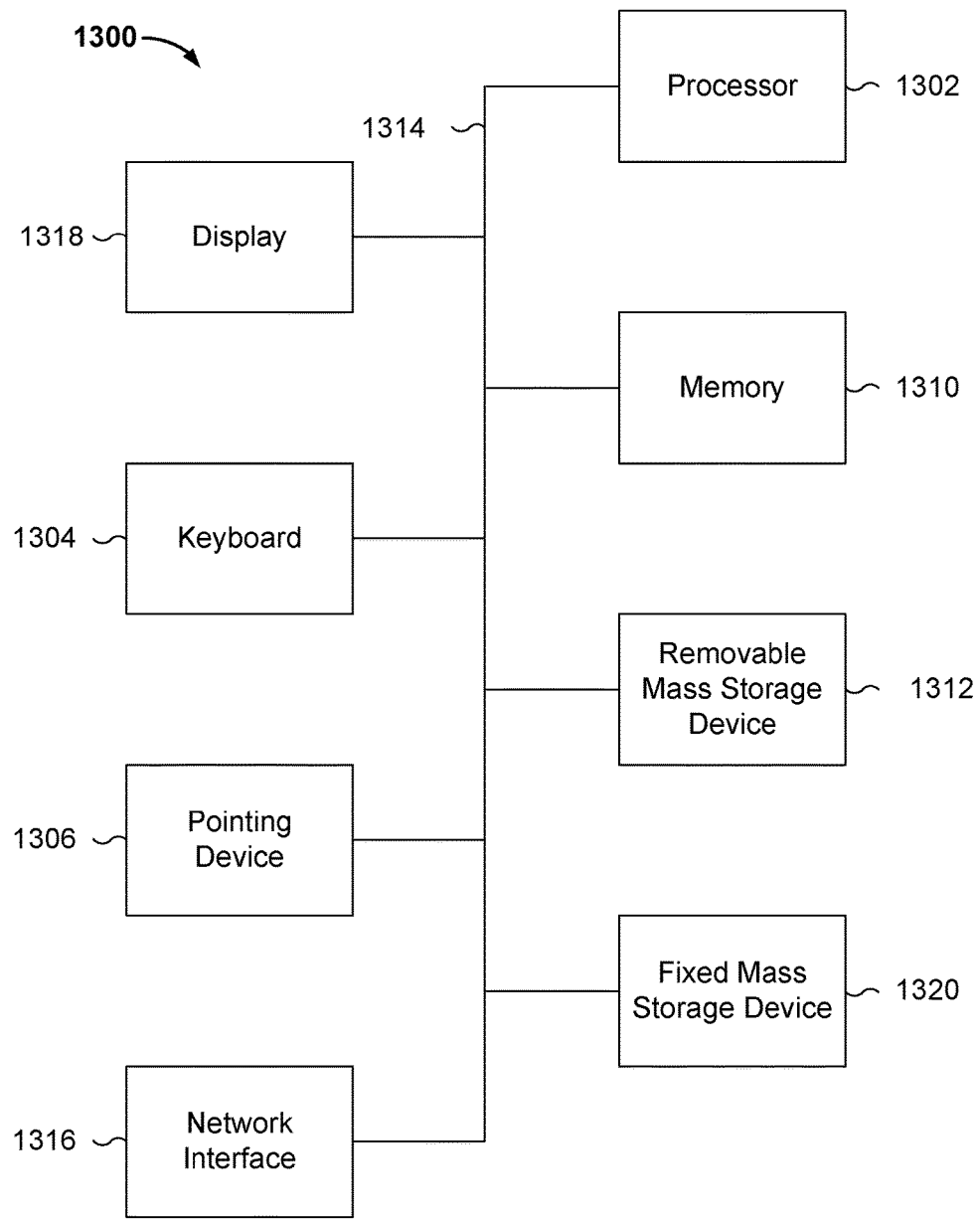
FIG. 13 is a functional diagram illustrating an embodiment of a programmed computer system for preprocessing images.

FIG. 13 is a functional diagram illustrating an embodiment of a programmed computer system for preprocessing images. As will be apparent, other computer system architectures and configurations can be used to perform the preprocessing of images. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1302 is a general purpose digital processor that controls the operation of the computer system 1300. Using instructions retrieved from memory 1310, the processor 1302 controls the reception and manipulation of input data, and the output and display of data on output devices (e.g., display 1318).

Processor 1302 is coupled bi-directionally with memory 1310, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data, and objects used by the processor 1302 to perform its functions (e.g., programmed instructions). For example, memory 1310 can include any suitable computer-readable storage media, described below, depending on whether, for example, data access needs to be bi-directional or uni-directional. For example, processor 1302 can also directly and very rapidly retrieve and store frequently needed data in a cache memory (not shown).

A removable mass storage device 1312 provides additional data storage capacity for the computer system 1300, and is coupled either bi-directionally (read/write) or uni-directionally (read only) to processor 1302. For example, storage 1312 can also include computer-readable media such as magnetic tape, flash memory, PC-CARDS, portable mass storage devices, holographic storage devices, and other storage devices. A fixed mass storage 1320 can also, for example, provide additional data storage capacity. The most common example of mass storage 1320 is a hard disk drive. Mass storages 1312 and 1320 generally store additional programming instructions, data, and the like that typically are not in active use by the processor 1302. It will be appreciated that the information retained within mass storages 1312 and 1320 can be incorporated, if needed, in standard fashion as part of memory 1310 (e.g., RAM) as virtual memory.

In addition to providing processor 1302 access to storage subsystems, bus 1314 can also be used to provide access to other subsystems and devices. As shown, these can include a display monitor 1318, a network interface 1316, a keyboard 1304, and a pointing device 1306, as well as an auxiliary input/output device interface, a sound card, speakers, and other subsystems as needed. For example, the pointing device 1306 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 13 is but an example of a computer system suitable for use with the various embodiments disclosed herein. Other computer systems suitable for such use can include additional or fewer subsystems. In addition, bus 1314 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining, using a processor, a reference similarity of an image to be processed, wherein:
   the image to be processed corresponds to a multichannel image; and
   the reference similarity is determined based on similarities of pairs of channels of the image to be processed;
   in response to a determination that the reference similarity is less than or equal to a first preset threshold value, processing, based on a biometric color model, the image to determine a biometric color area of the image;
   in response to a determination that the reference similarity is greater than or equal to a second preset threshold value, determining, using the processor, the image to be processed to be unsuitable for processing based on the biometric color model, wherein the second preset threshold value is greater than the first preset threshold value; and
   determining, based on a preset processing technique, whether the image is suitable for the biometric color model, wherein:
   the preset processing technique comprises:
      retrieving, using the processor, a pending color saturation of the image, comprising:
         converting, using the processor, an image format of the image to an HIS format; and
         determining, using the processor, a histogram of an S channel of the image to be the color saturation of the image;
      inputting, using the processor, the pending color saturation into a preset classifier; and
      obtaining, using the processor, an output result of the preset classifier, wherein the output result corresponds to a model representing whether the image is suitable for the biometric color model.

2. The method as described in claim 1,
   the first preset threshold value is determined at least by:
      computing, using the processor, a reference similarity of each image included in a training image set, wherein the training image set includes at least one image that is suitable for the biometric color model and at least one image that is unsuitable for processing based on the biometric color model;
      based on a false acceptance rate, selecting a first reference similarity of a first image included in the training image set; and
      determining the selected first reference similarity to be the first preset threshold value; and
   the second preset threshold value is determined at least by:
      based on a false rejection rate, selecting a second reference similarity of a second image included in the training image set; and
      determining the second reference similarity to be the second preset threshold value.

3. The method as described in claim 1, wherein the determining of the reference similarity of the image to be processed comprises:
   computing, using the processor, the similarities of the pairs of channels of the image to be processed; and
   determining, using the processor, a greatest value of the similarities of the pairs of channels to be the reference similarity of the image to be processed.

4. The method as described in claim 1, wherein the determining of the reference similarity of the image to be processed comprises:

computing, using the processor, the similarities of the pairs of channels of the image to be processed; and determining, using the processor, an average value of the similarities of the pairs of channels to be the reference similarity of the image to be processed.

5. The method as described in claim 1, wherein:

the determining of the reference similarity of the image to be processed comprises:

computing, using the processor, the similarities of the pairs of channels of the image to be processed; and determining, using the processor, an average value of the similarities of the pairs of channels to be the reference similarity of the image to be processed; and the computing of the similarities of the pairs of channels of the image to be processed comprises:

performing one of the following:

determining, using the processor, a cosine distance between histograms of the pairs of channels to be the similarities of the pairs of channels;

determining, using the processor, a Manhattan distance between histograms of the pairs of channels to be the similarities of the pairs of channels; or determining, using the processor, a chi-square distance between histograms of the pairs of channels to be the similarities of the pairs of channels.

6. A method, comprising:

determining, using a processor, a reference similarity of an image to be processed, wherein:

the image to be processed corresponds to a multichannel image; and the reference similarity is determined based on similarities of pairs of channels of the image to be processed;

in response to a determination that the reference similarity is less than or equal to a first preset threshold value, processing, based on a biometric color model, the image to determine a biometric color area of the image;

in response to a determination that the reference similarity is greater than or equal to a second preset threshold value, determining, using the processor, the image to be processed to be unsuitable for processing based on the biometric color model, wherein the second preset threshold value is greater than the first preset threshold value;

in response to a determination that the reference similarity is not less than or equal to the first preset threshold value and is not greater than or equal to the second preset threshold value, determining, using the processor, the image to be processed is to be a pending image; and determining, based on a preset processing technique, whether the pending image is suitable for the biometric color model, wherein:

the preset processing technique comprises:

retrieving, using the processor, a pending color saturation of the pending image, comprising:

converting, using the processor, an image format of the pending image to an HIS format; and determining, using the processor, a histogram of an S channel of the pending image to be the color saturation of the pending image;

inputting, using the processor, the pending color saturation into a preset classifier; and obtaining, using the processor, an output result of the preset classifier, wherein:

the preset classifier is established in advance;

an input parameter of the preset classifier is the color saturation, and the output result corresponds to a model representing whether the image is suitable for the biometric color model.

7. The method as described in claim 1, wherein the image to be processed is an RGB color format image.

8. A device, comprising:

one or more processors; and one or more memories coupled with the one or more processors, wherein the one or more memories are configured to provide the one or more processors with instructions which when executed cause the one or more processors to:

determine a reference similarity of an image to be processed, wherein:

the image to be processed corresponds to a multi-channel image; and the reference similarity is determined based on similarities of pairs of channels of the image to be processed;

in response to a determination that the reference similarity is less than or equal to a first preset threshold value, process, based on a biometric color model, the image to determine a biometric color area of the image;

in response to a determination that the reference similarity is greater than or equal to a second preset threshold value, determine the image to be processed to be unsuitable for processing based on the biometric color model, wherein the second preset threshold value is greater than the first preset threshold value; and determine, based on a preset processing technique, whether the image is suitable for the biometric color model, wherein:

the preset processing technique comprises:

retrieve a pending color saturation of the image, comprising to:

convert an image format of the image to an HIS format; and determine a histogram of an S channel of the image to be the color saturation of the image;

input the pending color saturation into a preset classifier; and obtain an output result of the preset classifier, wherein the output result corresponds to a model representing whether the image is suitable for the biometric color model.

9. The device as described in claim 8, the first preset threshold value is determined at least by:

compute a reference similarity of each image included in a training image set, wherein the training image set includes at least one image that is suitable for the biometric color model and at least one image that is unsuitable for processing based on the biometric color model;

based on a false acceptance rate, select a first reference similarity of a first image included in the training image set; and determine the selected first reference similarity to be the first preset threshold value; and the second preset threshold value is determined at least by:

based on a false rejection rate, select a second reference similarity of a second image included in the training image set; and determine the second reference similarity to be the second preset threshold value.

10. The device as described in claim 8, wherein the determining of the reference similarity of the image to be processed comprises to:
compute the similarities of the pairs of channels of the image to be processed; and
determine a greatest value of the similarities of the pairs of channels to be the reference similarity of the image to be processed.

11. The device as described in claim 8, wherein:
the determining of the reference similarity of the image to be processed comprises to:
compute the similarities of the pairs of channels of the image to be processed; and
determine an average value of the similarities of the pairs of channels to be the reference similarity of the image to be processed; and
the computing of the similarities of the pairs of channels of the image to be processed comprises to:
perform one of the following:
determine a cosine distance between histograms of the pairs of channels to be the similarities of the pairs of channels;
determine a Manhattan distance between histograms of the pairs of channels to be the similarities of the pairs of channels; or
determine a chi-square distance between histograms of the pairs of channels to be the similarities of the pairs of channels.

12. A device, comprising:
one or more processors; and
one or more memories coupled with the one or more processors, wherein the one or more memories are configured to provide the one or more processors with instructions which when executed cause the one or more processors to:
determine a reference similarity of an image to be processed, wherein:
the image to be processed corresponds to a multi-channel image; and
the reference similarity is determined based on similarities of pairs of channels of the image to be processed;
in response to a determination that the reference similarity is less than or equal to a first preset threshold value, process, based on a biometric color model, the image to determine a biometric color area of the image;
in response to a determination that the reference similarity is greater than or equal to a second preset threshold value, determine the image to be processed to be unsuitable for processing based on the biometric color model, wherein the second preset threshold value is greater than the first preset threshold value;
in response to a determination that the reference similarity is greater than or equal to a second preset threshold value, determine the image to be processed to be unsuitable for processing based on the biometric color model, wherein the second preset threshold value is greater than the first preset threshold value;
in response to a determination that the reference similarity is not less than or equal to the first preset threshold value and is not greater than or equal to the second preset threshold value, determine the image to be processed is to be a pending image; and
determine, based on a preset processing technique, whether the pending image is suitable for the biometric color model, wherein:
the preset processing technique comprises to:
retrieve a pending color saturation of the pending; image, comprising to:
convert an image format of the pending image to an HIS format; and
determine a histogram of an S channel of the pending image to be the color saturation of the pending image;
input the pending color saturation into a preset classifier; and
obtain an output result of the preset classifier, wherein:
the preset classifier is established in advance;
an input parameter of the preset classifier is the color saturation; and
the output result corresponds to a model representing whether the image is suitable for the biometric color model.

13. The device as described in claim 8, wherein the image to be processed is an RGB color format image.

14. A computer program product being embodied in a tangible non-transitory computer readable storage medium and comprising computer instructions for:
determining a reference similarity of an image to be processed, wherein:
the image to be processed corresponds to a multichannel image; and
the reference similarity is determined based on similarities of pairs of channels of the image to be processed;
in response to a determination that the reference similarity is less than or equal to a first preset threshold value, processing, based on a biometric color model, the image to determine a biometric color area of the image;
in response to a determination that the reference similarity is greater than or equal to a second preset threshold value, determining the image to be processed to be unsuitable for processing based on the biometric color model, wherein the second preset threshold value is greater than the first preset threshold value;
determining, based on a preset processing technique, whether the image is suitable for the biometric color model, wherein:
the preset processing technique comprises:
retrieving a pending color saturation of the image, comprising:
converting an image format of the image to an HIS format; and
determining a histogram of an S channel of the image to be the color saturation of the image;
inputting the pending color saturation into a preset classifier; and
obtaining an output result of the preset classifier, wherein the output result corresponds to a model representing whether the image is suitable for the biometric color model.

15. A computer program product being embodied in a tangible non-transitory computer readable storage medium and comprising computer instructions for:
determining a reference similarity of an image to be processed, wherein:
the image to be processed corresponds to a multichannel image; and the reference similarity is determined based on similarities of pairs of channels of the image to be processed;

in response to a determination that the reference similarity is less than or equal to a first preset threshold value, processing, based on a biometric color model, the image to determine a biometric color area of the image;

in response to a determination that the reference similarity is greater than or equal to a second preset threshold value, determining the image to be processed to be unsuitable for processing based on the biometric color model, wherein the second preset threshold value is greater than the first preset threshold value;

in response to a determination that the reference similarity is not less than or equal to the first preset threshold value and is not greater than or equal to the second preset threshold value, determining the image to be processed is to be a pending image; and determining, based on a preset processing technique, whether the pending image is suitable for the biometric color model, wherein:

the preset processing technique comprises:

retrieving a pending color saturation of the pending image, comprising:

converting an image format of the pending image to an HIS format; and determining a histogram of an S channel of the pending image to be the color saturation of the pending image;

inputting the pending color saturation into a preset classifier; and obtaining an output result of the preset classifier, wherein:

the preset classifier is established in advance;

an input parameter of the preset classifier is the color saturation, and the output result corresponds to a model representing whether the image is suitable for the biometric color model.

* * * * *

UNITED STATES PATENT AND TRADEMARK OFFICE
CERTIFICATE OF CORRECTION

PATENT NO. : 10,210,424 B2  
APPLICATION NO. : 15/192746  
DATED : February 19, 2019  
INVENTOR(S) : Kun Yu Page 1 of 1

It is certified that error appears in the above-identified patent and that said Letters Patent is hereby corrected as shown below:

In the Claims

In Column 20, Line 5, Claim 12, after "of the pending" delete ";".

Signed and Sealed this  
Twenty-seventh Day of August, 2019

Andrei Iancu  
*Director of the United States Patent and Trademark Office*